United States Patent
Behmenburg et al.

(10) Patent No.: US 7,886,882 B2
(45) Date of Patent: Feb. 15, 2011

(54) PNEUMATIC SPRING DAMPER UNIT

(75) Inventors: Christof Behmenburg, Lauenau (DE); Heinz Job, Neustadt (DE); Thomas Engelke, Hannover (DE); Jörg Kock, Burgwedel (DE); Hermann Hoinkhaus, Burgwedel (DE)

(73) Assignee: Continental Aktiengesellschaf, Hannover (DE)

( * ) Notice: Subject to any disclaimer, the term of this patent is extended or adjusted under 35 U.S.C. 154(b) by 830 days.

(21) Appl. No.: 11/792,982

(22) PCT Filed: Nov. 16, 2005

(86) PCT No.: PCT/EP2005/012276

§ 371 (c)(1),
(2), (4) Date: Jun. 13, 2007

(87) PCT Pub. No.: WO2006/063647

PCT Pub. Date: Jun. 22, 2006

(65) Prior Publication Data

US 2008/0000739 A1    Jan. 3, 2008

(30) Foreign Application Priority Data

Dec. 14, 2004   (DE) .................. 10 2004 060 002

(51) Int. Cl.
*F16F 9/348*    (2006.01)
*F16F 9/34*    (2006.01)
*F16F 9/14*    (2006.01)

(52) U.S. Cl. ............ 188/282.4; 188/282.9; 188/322.15; 267/64.15

(58) Field of Classification Search .............. 188/282.2, 188/282.4, 282.5, 282.7, 282.8, 282.9, 322.13, 188/322.15; 267/64.11, 64.13, 64.15, 64.25, 267/64.26

See application file for complete search history.

(56) References Cited

U.S. PATENT DOCUMENTS

| | | | | | |
|---|---|---|---|---|---|
| 2,069,791 | A | * | 2/1937 | Wallace | 267/64.22 |
| 2,570,362 | A | * | 10/1951 | Mercier | 267/64.26 |
| 2,668,603 | A | * | 2/1954 | Winslow | 188/317 |
| 2,866,633 | A | * | 12/1958 | Schnitzer | 267/64.15 |
| 2,947,386 | A | * | 8/1960 | Schnitzer | 267/64.26 |
| 4,823,922 | A | * | 4/1989 | Ergun | 188/282.8 |
| 6,427,812 | B2 | * | 8/2002 | Crawley et al. | 188/322.13 |
| 2003/0106753 | A1 | * | 6/2003 | Nezu et al. | 188/322.15 |
| 2003/0173723 | A1 | * | 9/2003 | Behmenburg et al. | 267/122 |

FOREIGN PATENT DOCUMENTS

| | | |
|---|---|---|
| DE | 10005180 C1 | 8/2001 |
| DE | 10135261 C1 | 10/2002 |
| EP | 0257779 A | 3/1988 |
| EP | 1464865 A | 10/2004 |

* cited by examiner

Primary Examiner—Thomas J Williams (57) ABSTRACT

Disclosed is a gas spring/damper unit (1) having at least one movably mounted displacement piston (2) and two displacement chambers (3, 4) whose volume increases or diminishes according to the direction of travel of the displacement piston (2) and which are interconnected via overflow ducts (6, 7) in which throttle valves (16, 16', 16", 17, 17', 17", 17''') are disposed. Several throttle valves (16, 16', 16", 17, 17', 17", 17''') having different valve characteristics are positioned so as to be effective in one direction of flow. One throttle valve (17) is designed for damping eigenfrequencies ranging from 1 to 1.5 Hz while another throttle valve (17') is designed for damping eigenfrequencies ranging from 10 to 40 Hz.

19 Claims, 6 Drawing Sheets

PNEUMATIC SPRING DAMPER UNIT

BACKGROUND OF THE INVENTION

The invention relates to a pneumatic spring damper unit having at least one moveably mounted expeller piston and two expeller chambers whose volumes are increased or decreased depending on the direction of movement of the expeller piston and which are connected to one another by means of overflow ducts in which throttle valves are arranged.

DE 43 34 007 A1 discloses a pneumatic spring damper unit with electromagnetically controllable overflow valves whose closure elements are formed by valve spring plates. The magnetic flux permeates the valve spring plates and the valve spring plates interact in their closed position with assigned stop faces. The closing force can be varied by a controllable electromagnet so that a spring damper unit with variable adjustment is provided. This spring damper unit makes it possible to set the maximum closing force or bias and to determine the pressure from which the valve opens.

DE 101 35 261 C1 discloses a pneumatic spring damper unit with overflow throttles which are closed with sprung sealing disks. The sprung sealing disks are not tightly clamped in but rather fixed by a spring force only for a predetermined pressure differential range. After a certain pressure has been exceeded, the clamping region lifts off, the spring-loading force for loading the sealing disk being preferably applied by an annular washer which is preferably also spring-loaded.

The object of the present invention is to make available a pneumatic spring damper unit which is of simple design and can be easily adapted to the desired sprung characteristic.

SUMMARY OF THE INVENTION

According to the invention, this object is achieved by means of a pneumatic spring damper unit, in which a plurality of throttle valves with differing valve characteristics are arranged so as to be effective in one direction of flow, one throttle valve being designed to damp natural frequencies in the range from 1 to 1.5 Hz and another throttle valve being designed to damp natural frequencies in the range from 10 to 40 Hz. By combining a plurality of throttle valves in one direction of flow with differing valve characteristics, that is to say with differing opening times, flow cross sections and flow resistances, it is easily possible to assembly a pneumatic spring damper unit which is adapted in an optimum way to the respective purpose of use. It is thus possible, for example, to make available a relatively high damping even at low damper speeds in order, when used in vehicles, to steady the vehicle body which has a natural frequency in the range from 1 to 1.5 Hz. During normal operation and when relatively high damper speeds occur, the ratio of damper force and damper speed can be changed in order to achieve a desired driving behavior. If a defined speed or other parameters are exceeded, a further valve, which is responsible, for example, for damping the vehicle axle which has a natural frequency in a range from 10 to 40 Hz, opens and restricts the damper force. It is thus possible to adapt the damper force characteristic curve also to large damper speeds, in which case adaptation of the damping of the body of vehicles does not automatically give rise to a very steep characteristic curve at relatively high speeds and thus automatically to a change in the axle damping, that is to say the damping at relatively high frequencies, which can no longer be adaptive.

One development of the invention provides for the throttle valves which are respectively effective in one direction of flow to open under different flow pressures, that is to say the valve bodies which are subject to bias open at different times and open overflow ducts. This ensures that up to a certain flow pressure only some of the overflow ducts are opened so that the maximum flow volume continues to be restricted.

In order to make available a differing damper characteristic for the extension stage and compression stage, the throttle valves for the extension stage and compression stage each have different flow cross sections, in particular the throttle valves for the compression stage are larger than those for the compression stage in order to bring about greater damping in the extension stage.

One development of the invention provides for the damper system to be based on bias adaptation, that is to say for the throttle valves to be spring mounted counter to the flow pressure and to remain closed until a certain flow pressure is reached. The throttle valves therefore do not open, and allow the air or the gas to flow from one expeller chamber into the other, until a specific flow pressure has been reached. This can be done, for example, by virtue of the fact that the throttle valves which are effective in a common direction of flow have a different spring bias, while the other geometric dimensions are the same. Alternatively, given identical spring bias and differing geometric dimensions the various valves may open successively in a common direction of flow.

A simple way of keeping the valves closed under bias is that the throttle valves are pressed into corresponding valve seats by means of helical springs or axially extending spiral springs.

One advantageous embodiment of the invention provides for the expeller piston to be embodied as a double acting expeller piston which is moveably mounted in a cylinder. If the expeller piston is moved in one direction, the volume of the expeller chamber located in the direction of movement is decreased, while the volume of the other expeller chamber is correspondingly increased. As a result, the structural complexity is reduced since only one cylinder has to be provided with a piston rod and a piston. However, there is basically also the possibility of providing two or more cylinders and pistons and of arranging the throttle valves in connecting lines or overflow ducts. A particularly compact design of a pneumatic spring damper unit is obtained if the throttle valves are mounted within the expeller piston, it being possible to provide the individual valves with valve sets, spring and valve plates or valve bodies as one physical unit and of inserting them into the expeller piston. It is likewise possible to use modules with a plurality of valves with different valve characteristics in the expeller piston, for example four throttle valve modules, two of which are oriented in the compression direction and two in the extension direction.

Many throttle valves only open at a specific adjustment speed. Even when very slow excitations occur it is frequently desired to provide low damper forces. In order to achieve this, at least one bypass which is provided for a small amount of gas to pass through from one expeller chamber into the other expeller chamber is formed between the expeller chambers. The bypass simulates here the friction which occurs in the conventional damper and additionally permits level adaptation by allowing the overall quantity of gas to be increased or decreased and thus the level to be raised or lowered. The bypass can likewise be formed in a throttle valve or in a module composed of a plurality of throttle valves.

In order to be able to perform a separate adjustment of the damper characteristic with respect to the extension stage or compression stage, one bypass is formed in each direction flow and is also effective only in this direction. The bypass can be closed counter to this direction of flow by an easily moving flap. There is provision here for the bypass to have a larger flow cross section in one direction of flow than the bypass in the other direction of flow, and the bypass will preferably have a larger flow cross section in the compression direction than that in the extension direction.

One development of the invention provides that at least one adjustment device is provided for setting the valve characteristic, in particular the bias of at least one throttle valve, in order to be able to influence the throttle system of the pneumatic spring damper unit directly. In the installed state, the damper characteristic of the pneumatic spring damper unit can thus be changed, and the chassis of a vehicle can thus be adapted to the requirements under changing ambient conditions. By changing the bias of, for example, the damper force limiting valve, the so-called blowoff valve, the maximum achievable damper force can be increased or reduced.

In order to stimulate the friction in a pneumatic spring damper unit such as is implemented by the bypass valve in oil hydraulic dampers, a further throttle valve is provided whose characteristics, that is to say the opening time and the opening travel or opening angle, can be changed in order to be able to implement a larger or smaller degree of damping in the pneumatic spring damper unit. The change in the valve characteristic is preferably brought about by an adjustment device which is assigned to the throttle valve or valves.

In one embodiment, the adjustment device has an electromagnet actuator in order to be able to influence the adjustment characteristic directly and thus increase the adjustment speed. An adjustment can be carried out, for example, by the valve spring for a throttle valve being assigned an adjustment mechanism which is activated by extraneous force and by means of which the spring bias can be varied. This is carried out, for example, by increasing or decreasing the spring bias by means of an adjusting screw or an adjusting nut, so that the corresponding valve opens later or earlier.

The second possible way of adjusting the damping is to vary the size of the face against which there is a flow, thus changing the pressure necessary for opening. The further principle is to control the air flow rate by means of a slider of a second throttle unit which is connected in parallel for each direction of flow. The throttle which is connected in parallel can be additionally equipped on an individual basis.

An exemplary embodiment of the invention is described in more detail below with reference to the appended figures.

DETAILED DESCRIPTION OF THE DRAWINGS

Figure 1:
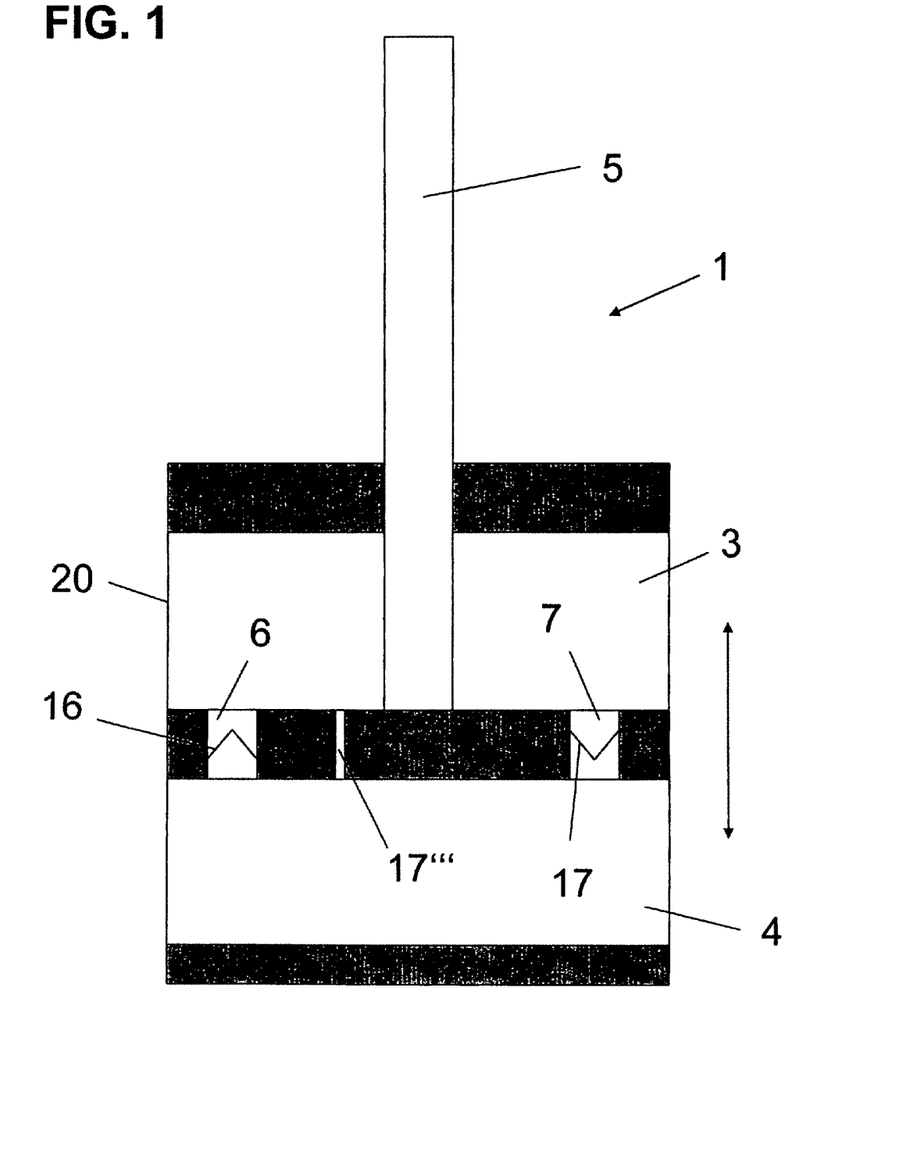
FIG. 1 shows the basic design of a pneumatic spring damper unit.

FIG. 1 is a schematic sectional illustration of a pneumatic spring damper unit 1 in which a moveably mounted expeller piston 2 in a cylinder 20 forms two expeller chambers 3, 4.

The expeller chamber 2 can have force applied to it via a piston rod 5 so that a movement can occur in the direction of the double arrow. If the expeller piston 2 in the present figure is pressed downwards by means of application of force by the piston rod 5, the volume of the expeller chamber 4 is decreased to the same degree that the volume of the expeller chamber 3 is increased, minus the displaced volume of the piston rod 5.

Within the expeller piston 2, overflow ducts 6, 7 which permit gas, preferably air, located in the expeller chambers 3, 4 to pass from one expeller chamber 3, 4 into the respective other expeller chamber 4, 3 are formed. Throttle valves 16, 17 which allow the gas to flow through in one of the respective directions and block it in the other are arranged in the overflow ducts 6, 7.

Likewise, a bypass 17''' through which the gas present in the expeller chambers 3, 4 can flow is formed in the expeller piston 2 so that even when the through-flow volumes are small a certain degree of mobility of the expeller piston 2 with simultaneous damping is ensured.

In order to allow different quantities of gas to pass through the bypass 17''' as a function of the direction, a plurality of bypasses can be formed in the expeller piston 2, which bypasses are closed with corresponding flaps so that in the case of a downward movement, the so-called compression stage, of the expeller piston 2 a different bypass is activated than in the case of an upward movement, the so-called extension stage.

In order to be able to make available an adapted characteristic curve of the pneumatic spring damper unit 1, the throttle valves 16, 17 are each provided with a different valve characteristic so that different damper characteristic curves can be implemented for the extension stage and for the compression stage. Likewise there is provision for those throttle valves 16, 17 which are arranged so as to be effective in one direction of flow to have different valve characteristics in order to be able to obtain a finely matched damper characteristic curve so that relatively high damping is made available, for example, at low damper speeds, while other valves which restrict the damper force open at relatively high damper speeds. Likewise it is possible to provide a so-called "blowoff" valve which restricts the maximum damper force and is designed for high natural frequencies between 10 and 40 Hz.

Figure 2:
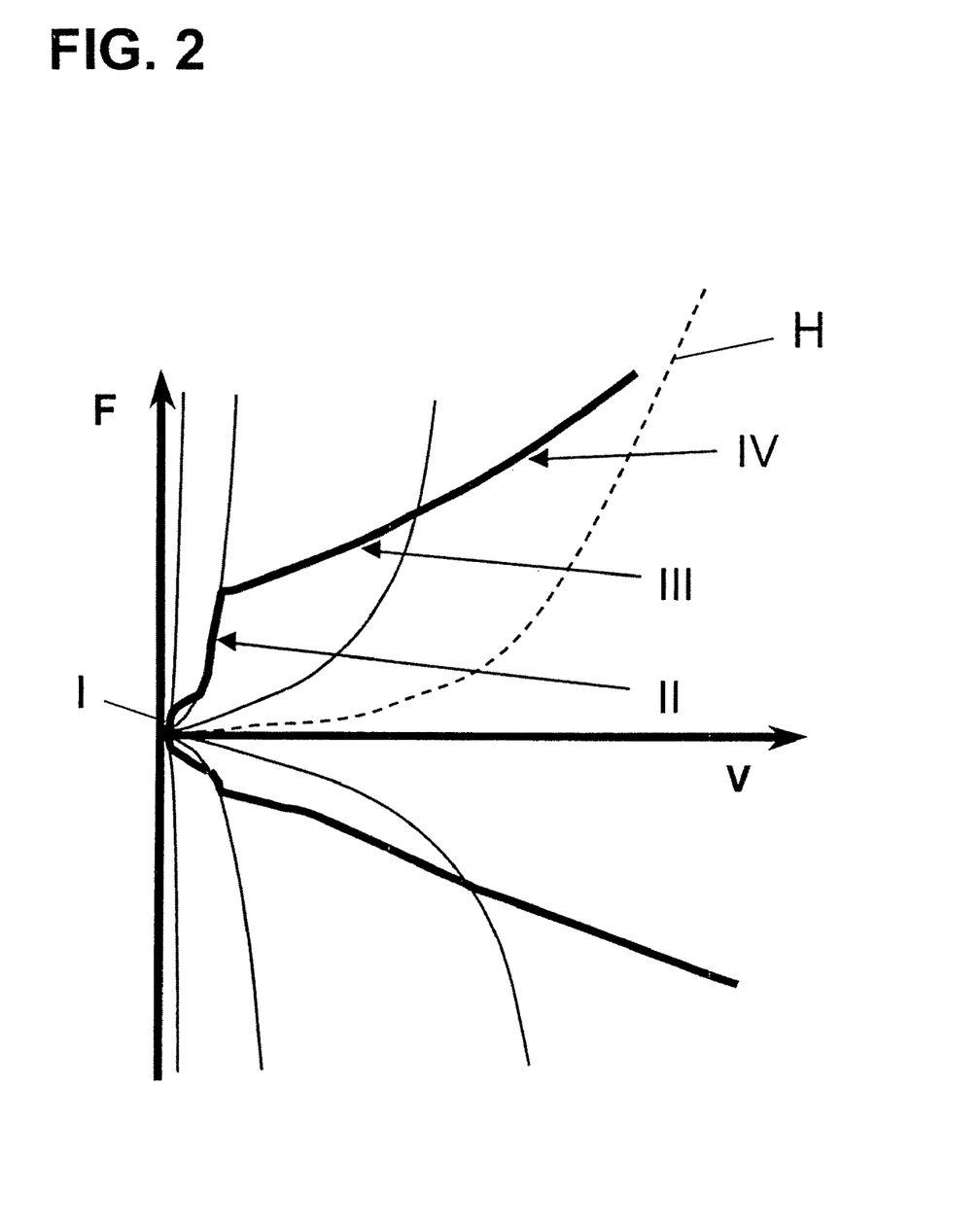
FIG. 2 shows a damper characteristic curve profile.

FIG. 2 shows an exemplary damper force characteristic curve in which the force F is plotted against the damper speed V. In the diagram, four regions are shown, in the first region I of which the force/speed characteristic is decisively influenced by the bypass 17''' which has a very small flow cross section and connects the two expeller chambers 3, 4 to one another in order to simulate the friction. At somewhat higher damper speeds, a comfort valve is effectively added, which valve is responsible essentially for the region II of the damper force characteristic curve. This comfort curve is, for example, a further bypass which is provided with a closure flap which is subjected to bias and has a larger flow cross section than the bias 17'''. As the damper speed rises further, a second valve which is provided with bias is connected into the circuit for the third region III, this is to the so-called vehicle body valve which is preferably embodied as the helical spring valve. The vehicle body valve damps the oscillations in the region of the natural frequencies of the body between 1 and 1.5 Hz, which act predominantly in the vertical direction. The incline of the spring force characteristic curve is reduced by the connection of the vehicle body valve into the circuit. In order to damp the oscillations in particular of the vehicle axle and to restrict the maximum damper force, a blowoff valve is connected into the circuit in the fourth section IV, which blowoff valve is effective in the range of natural frequencies between 10 and 40 Hz. The force profile curve approaches the envelope curve H as the speed increases, said envelope curve H representing the damper force F without the valves closed as if all the valves were in the position of maximum opening.

In FIG. 2 it is apparent that the damper force for the extension stage is plotted above the abscissa, and the damper force for the compression stage is plotted below the abscissa. In the diagram it is also apparent that the extension stage and the compression stage have different damper force characteristic curves, that is to say that the respective throttle valves or bypasses have different valve characteristics or flow cross sections or biases. There is provision here for the vehicle body valve to be embodied as a helical spring valve whose bias can be adjusted easily by means of an electric actuator in order to be able to directly influence the pneumatic spring throttle unit and to change the damper force curve characteristic in the region of the natural frequency of the body, that is to say at approximately 1 to 1.5 Hz. All the biased valves can be coupled to an actuator which changes the bias according to the respective requirements. The direct adjustment of the valves, that is to say not only the vehicle body valve but also the comfort valve and/or the blowoff valve permits very rapid adjustment of the damper characteristic curve at low cost. As well the helical valve, the blowoff valve can also be embodied as a spring washer valve. If the comfort valve is also embodied as a spring washer valve, it can also be integrated into the blowoff valve.

Figure 3:
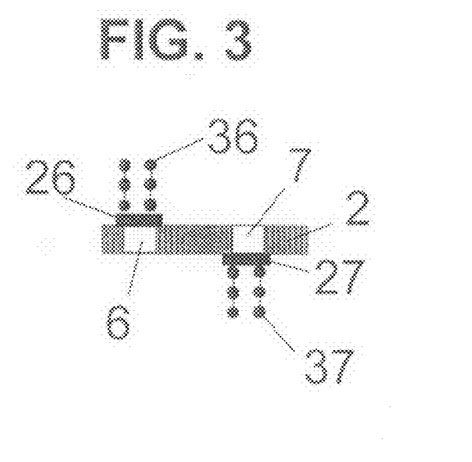
FIG. 3 shows the basic design of a helical spring throttle.

FIG. 3 shows the basic design of the valve solution for helical spring throttles in which the overflow ducts 6, 7 within the expeller piston 2 are closed off by means of valve plates 26, 27 which are pressed into their valve seats by means of helical springs 36, 37. Depending on the movement of the expeller piston 2, the valve plates 26, 27 are lifted out of the valve seat and moved counter to the bias of the respective compression spring 36, 37. In the case of relatively large adjustment speeds V, the pressure and thus the force which is applied to the helical springs 36, 37 by the valve plates 26, 27 are increased so that the latter are pressed together and the valve plates 26 and 27 are lifted up. Depending on the configuration, both the cross section of the overflow ducts 6, 7, the size of the valve plates 26, 27 and the bias of the helical springs 36, 37, it is possible to embody different valve characteristics differently in one direction of flow or for the extension stage or compression stage.

Figure 4A:
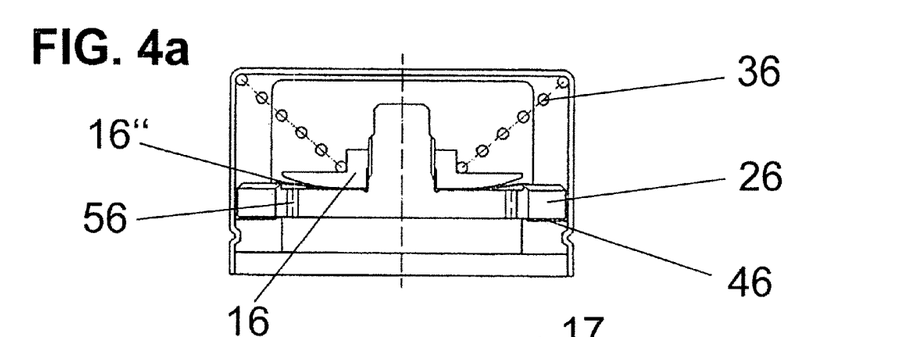
FIGS. 4*a* to 4*c* show components of a damper unit.
Figure 4B:
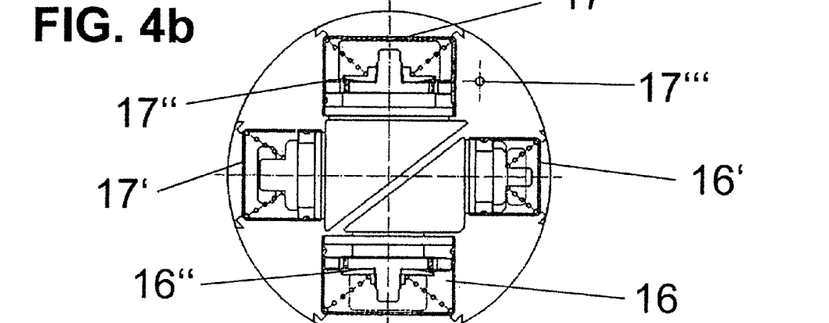
Figure 4C:
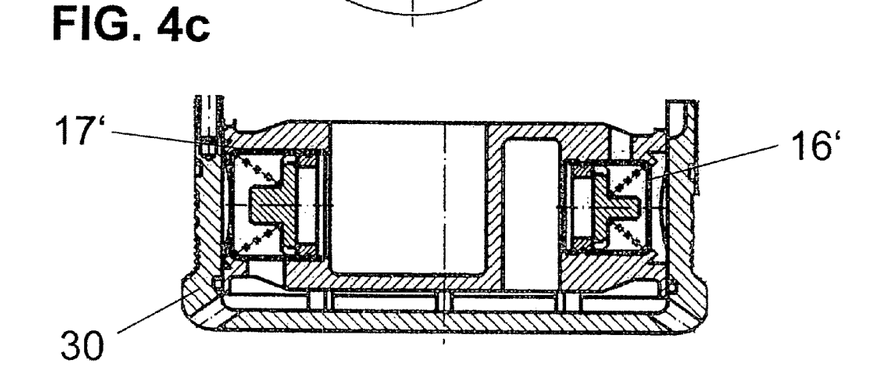

FIGS. 4a to 4c show an exemplary mounting concept and a pneumatic spring damper arrangement.

FIG. 4a shows a helical spring valve 16 as a vehicle body valve with a valve plate 26 which is held in the valve seat 46 by means of an axially extending spiral spring 36. A bore 56 is closed off by a prestressed spring plate and forms the comfort valve 16", with the bore typically having a diameter between 2 and 6 mm. The precise diameters are determined according to the other vehicle parameters. The bias 17''' which is accommodated in another valve housing is not illustrated; likewise, the blowoff valve 16' which forms an independent component is also absent.

An analogous design of the respective valves 16, 16', 16", 17, 17', 17", three valves 16, 16', 16" being provided for the compression stage, while the valves 17, 17', 17" are activated for the extension stage, is illustrated in FIG. 4b. The blowoff valves 16', 17' are embodied as separate valves, but can also be integrated into the vehicle body valves 16, 17. The valves 16, 16', 16", 17, 17', 17" for the compression stage and extension stage are dimensioned differently depending on the direction of flow. The bore 17''' forms a bypass and thus a fourth throttle valve, which permits a level control and is responsible for all of the damping. The bypass 17''' simulates the friction in a conventional damper and thus predominantly damps small amplitudes such as portions of rough underlying surface.

FIG. 4c shows an arrangement of the blowoff valves 16', 17' in an expeller piston or else in a throttle housing 30 which can be inserted into an expeller piston. In an analogous fashion, the vehicle body valves 16, 17 can be installed in the throttle housing 30. The valves 16, 16', 16", 17, 17', 17" are mounted in the throttle housing 30 and thus form a unit which can be prepared and accommodated in a completely adjusted fashion in an expeller piston.

Figure 5:
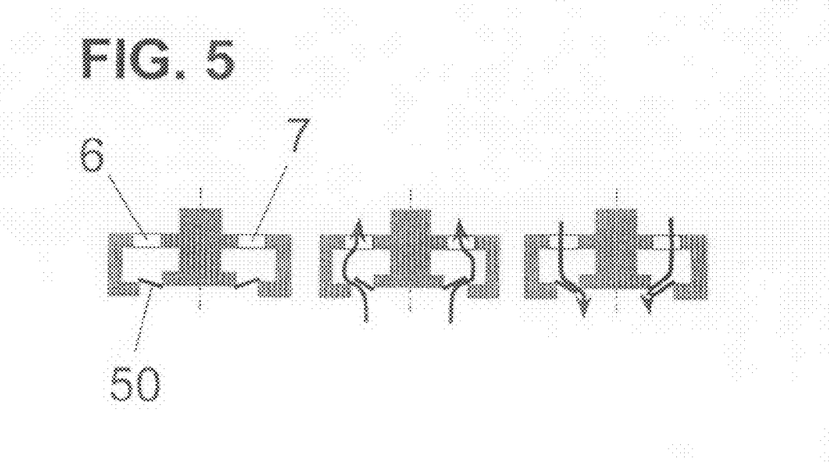
FIG. 5 shows an annular slide throttle.

FIG. 5 shows an alternative throttle principle in which overflow ducts 6, 7 are closed off by means of annular washers 50 made of spring steel. The annular washers 50 made of spring steel are provided with bias and the inner or outer support sides open depending on the direction of flow of the air or of the gas stream. An advantage of this arrangement is its simple design. It is problematic that the extension stage and compression stage cannot be set independently of one another.

Figure 6:
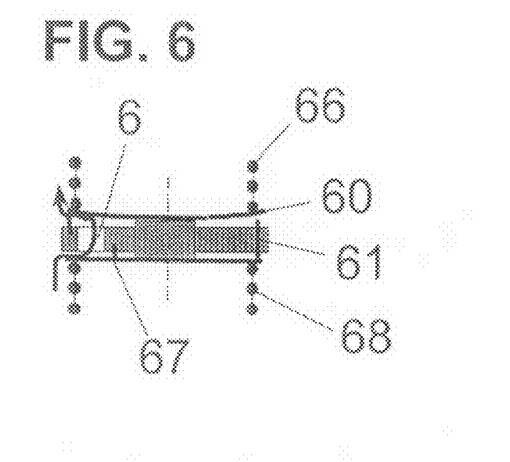
FIG. 6 shows a linear throttle.

FIG. 6 shows the principle of a linear throttle which is composed of a perforated throttle body 61 in which overflow ducts 6 are formed. The openings of the overflow ducts 6 are closed on the extension side and compression side by means of spring washers 60, 67. The bias of the spring washers 60, 67 is exerted by the helical springs 66, 68, and alternatively star springs can be used.

Figure 7:
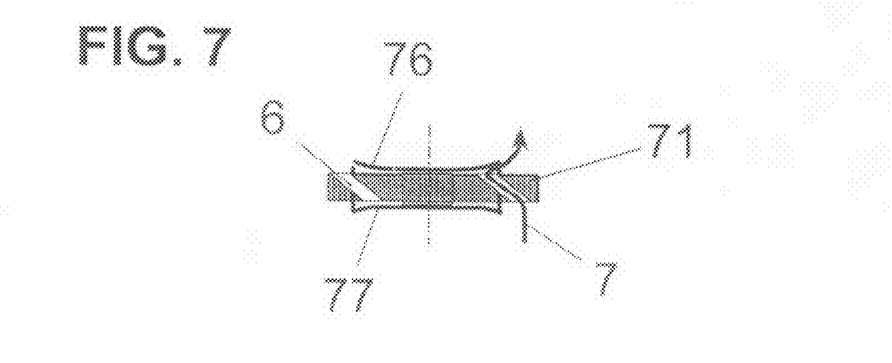
FIG. 7 shows a degressive throttle.

FIG. 7 shows a degressive throttle with a throttle body 71 in which overflow ducts 6, 7 are formed. The overflow ducts 6, 7 are closed off in the extension and compression directions by spring washers 76, 77, and thus the spring washers 76, 77 have an adjustable bias and preferably different bias.

All the spring systems or throttle valve systems of the FIGS. 3-7 can be used alternatively or in combination in order to make available a pneumatic spring damper unit 1.

Figure 8:
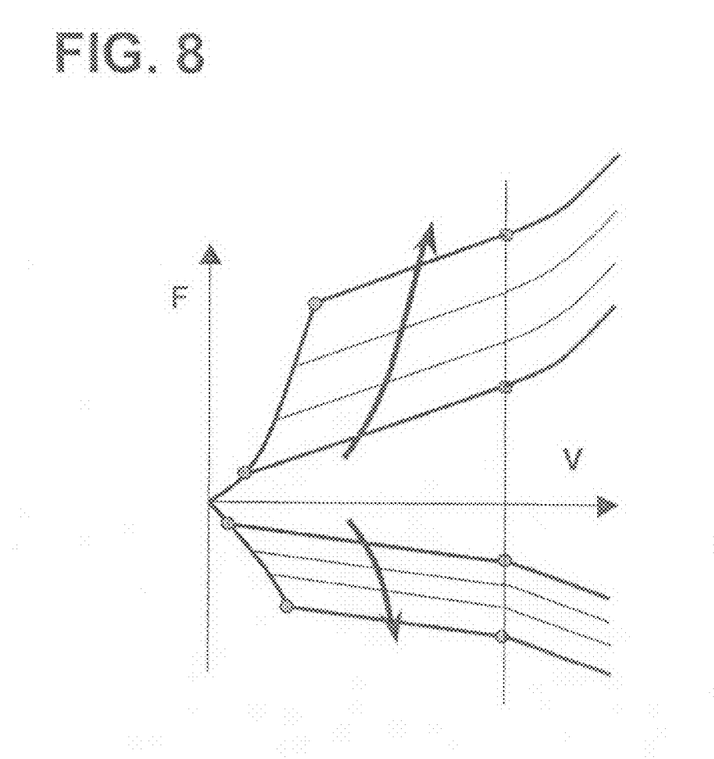
FIG. 8 shows damper characteristic curve profiles for differing valve spring bias.
Figure 8A:
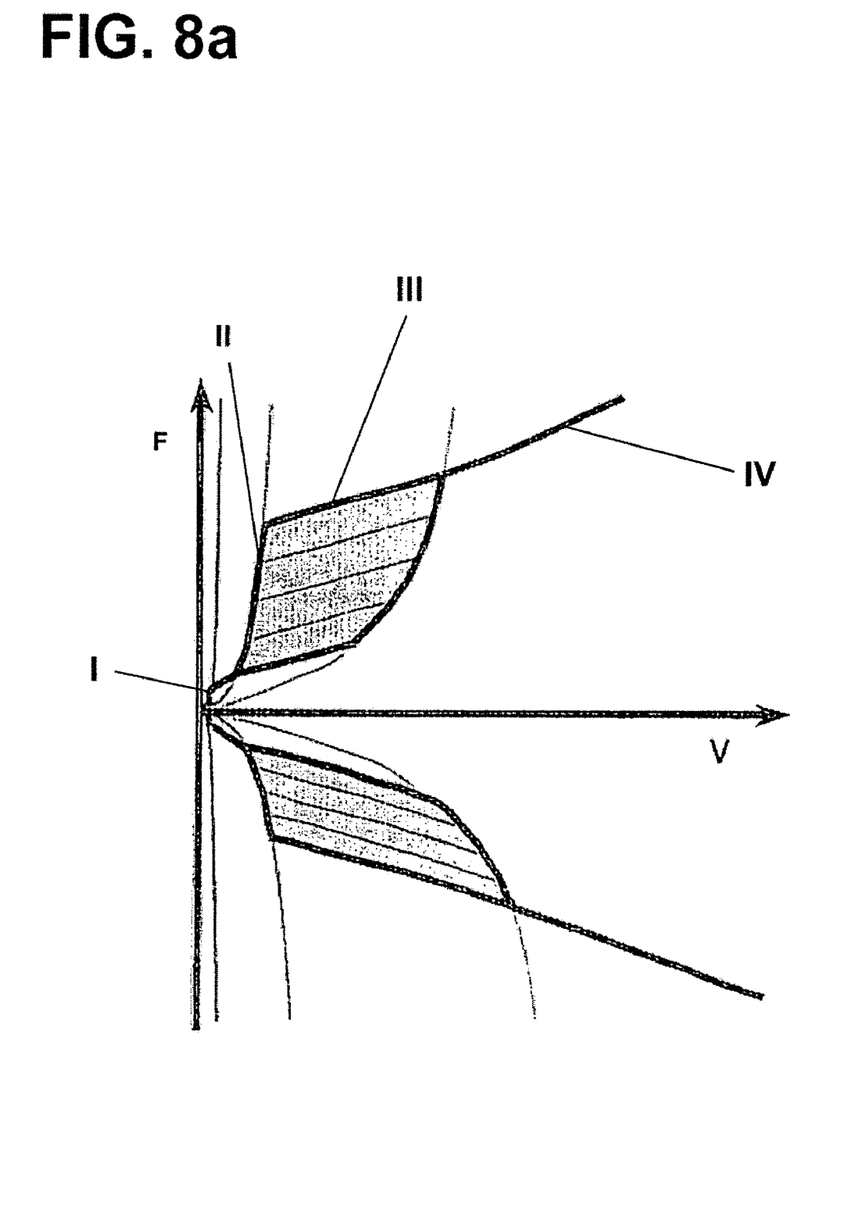
FIG. 8*a* shows a force curve characteristic diagram.

FIGS. 8 and 8a show examples of damping force characteristic fields or damping force characteristic curves in which the throttle valves have a variable bias applied to them so that the damper force characteristic curve and thus the spring behavior, for example of a vehicle, can be adapted. The extension stage is also plotted above the abscissa in FIGS. 8 and 8a and the compression stage below the abscissa, with the damping force F also being plotted here against the damper speed V. In FIG. 8, the adjustment range which can be achieved by changing the bias is illustrated in principle, the advantages of bias control being that the damper force characteristic curve can also be adapted for high damper speeds. In this context, adapting the damping of the vehicle body does not automatically lead to a very rigid characteristic curve at high speeds but instead a rigid characteristic curve can be implemented at low speeds, it being possible to change the gradient of said curve over the damper speed V. Because the adjustment of the bias acts directly on the throttle, for example by an electromechanical actuator moving an adjusting screw or adjusting nut by which the spring bias is changed, the adjustment is fast.

FIG. 8a shows damper force characteristic fields which are different for the extension stage and pressure stage and can be obtained by adjusting the vehicle body valves 16, 17. Here, the bias of the valves or of the valve is varied directly, for example by means of an electromotor or by changing the setting of a solenoid valve so that an electric adjustment throttle is made available for a pneumatic spring damper. This makes it possible to adjust the extension stage and compression stage independently of one another in a very favorable way. Likewise it is possible to embody the solenoid valve as a proportional valve, permitting the bias force to be predetermined precisely using the current irrespective of the opening travel of the throttle. The region I is influenced by means of the bypass 17''', while the region II is controlled by means of the comfort valve. The region of vehicle body damping III in a frequency range from 1 to 1.5 Hz is varied by means of the adjustable vehicle body valve 17, while the axial damping of the region IV is effective in the frequency spectrum 10 to 40 Hz. The vehicle body damping and the axial damping can thus be set and varied independently of one another.

Figure 9:
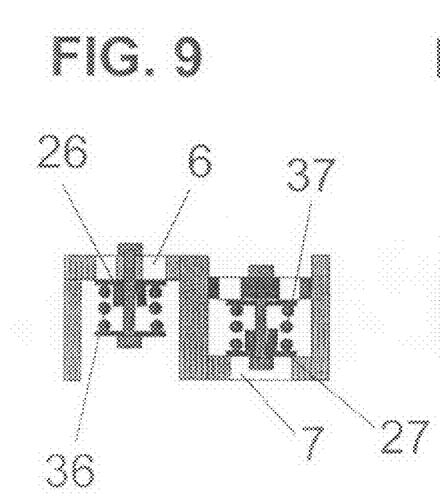
FIG. 9 shows a variant of a helical spring throttle.

FIG. 9 shows a schematic proposal for the embodiment of a helical spring throttle, likewise with two overflow ducts 6, 7 which are effective in the extension and compression directions and in which valve plates 26, 27 are held under bias in valve seats by means of helical springs 36, 37.

Figure 10:
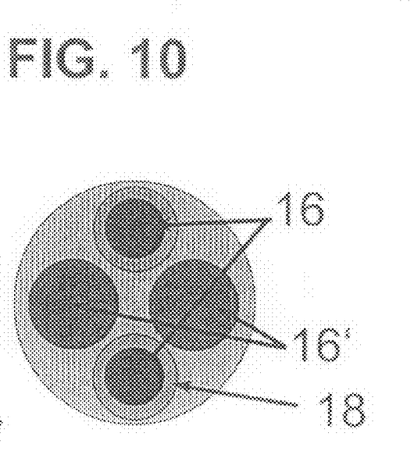
FIG. 10 shows a throttle module.

FIG. 10 shows a plan view of a throttle module with a total of four valves, two of which are embodied as blowoff valves 16' with a diameter of more than 20 mm as axial valves, and two further valves 16 of which are embodied with diameters between 10 and 15 mm as working valves for the vehicle body damping. Furthermore, a solenoid valve 18 is provided for the extension stage and compression stage and can be used to adjust the spring force characteristic curve very easily. The working valves 16 have a smaller opening diameter in the extension direction than in the compression direction, and the same applies to the blowoff valves 16'. It is possible to combine the working valves 16 and the blowoff valves 16' in one valve, the opening pressure for extension being in the range from 3 to 5 bar, and the opening pressure for the compression stage being in the range from 1.5 to 2.5 bar. Bypasses with different flow cross sections are provided for the extension and compression directions and are preferably arranged in the working valves 16. By adapting the damper characteristic curve it is possible for the pneumatic spring damper unit to be adapted to changing vehicle parameters and driving situations, and it is thus possible, for example, to react to the weight, to cornering and to braking processes and deceleration processes. Likewise it is possible to set the chassis according to the driver's wishes, for example as a sporty chassis or comfort chassis. In addition to these adaptive concepts it is also possible to react to changes in the underlying surface, wheel oscillations and the like by correspondingly adjusting the damper characteristic curve.

The advantage of a helical spring throttle is a relatively low actuation force since the ratio of the cross-sectional area used to the actuation face is approximately 1 in a helical spring throttle.

The invention claimed is:

1. A pneumatic spring damper unit (1) with an extension-stage and a compression stage, having at least one moveably mounted expeller piston (2) and two expeller chambers (3, 4) whose volumes are increased or decreased depending on the direction of movement of the expeller piston (2) and which are connected to one another by means of overflow ducts (6, 7) in which a plurality of unidirectional throttle valves (16, 16', 16", 17, 17', 17", 17''') are arranged with differing valve characteristics, with at least one of the throttle valves (17) being configured to damp natural frequencies in the range from 1 to 1.5 Hz, and at least one other throttle valve (17') being configured to damp natural frequencies in the range from 10 to 40 Hz, wherein at least four throttle valves (16, 16', 16", 17, 17', 17", 17''') are provided for each direction of flow and of which one is a bypass valve (17'''), one throttle valve (17) serves a frequency range from 1 Hz to 1.5 Hz, one throttle valve (17') serves a frequency range from 10 Hz to 40 Hz and one comfort valve (17") is present as a pilot-controlled bore.

2. The pneumatic spring damper unit as claimed in claim 1, wherein at least two of the unidirectional throttle valves (16, 16', 16", 17, 17', 17") of flow open under different flow pressures.

3. The pneumatic spring damper unit as claimed in claim 1, wherein a portion of the throttle valves open during the extension stage (17, 17', 17") and the other portion of throttle valves open in the compression stage (16, 16', 16") and wherein the valves open during the extension stage and the other portion of throttle valves open in the compression stage have different flow cross sections.

4. The pneumatic spring damper unit as claimed in claim 3, wherein the throttle valves (16, 16', 16") for the compression stage have a larger flow cross section than the throttle valves (17, 17', 17") for the extension stage.

5. The pneumatic spring damper unit as claimed in claim 1, wherein the throttle valves (16, 16', 16", 17, 17', 17") are mounted in a sprung fashion counter to the flow pressure and do not open until a specific flow pressure is reached.

6. The pneumatic spring damper unit as claimed in claim 5, wherein the throttle valves (16, 16', 16", 17, 17', 17") are differently biased.

7. The pneumatic spring damper as claimed in claim 1, wherein the throttle valves (16, 16', 16", 17, 17', 17") are pressed into valve seats by means of helical springs (36, 37).

8. The pneumatic spring damper as claimed in claim 1, wherein the throttle valves (16, 16', 16", 17, 17', 17") have differing flow cross sections.

9. The pneumatic spring damper unit as claimed in claim 1, wherein the expeller piston (2) is of double-acting design and is mounted in a cylinder (20).

10. The pneumatic spring damper unit as claimed in claim 9, wherein the throttle valves (16, 16', 16", 17, 17', 17", 17''') are mounted in the expeller piston (2).

11. The pneumatic spring damper unit as claimed in claim 1, wherein at least one throttle valve (17''') is embodied as a bypass between the expeller chambers (3, 4).

12. The pneumatic spring damper unit as claimed in claim 11, wherein the bypass (17''') is formed in a throttle valve (16, 16', 16", 17, 17', 17").

13. The pneumatic spring damper unit as claimed in claim 11, wherein a bypass (17''') is formed for each direction of flow, and the bypass (17''') in one direction of flow has a larger flow cross section than the bypass (17''') in the other direction of flow.

14. The pneumatic spring damper unit as claimed in claim 1, wherein an adjustment device is provided for setting a valve characteristic.

15. The pneumatic spring damper unit as claimed in claim 14, wherein the adjustment device changes the bias of at least one throttle valve (16, 16', 16", 17, 17', 17") and has an electromechanical actuator.

16. The pneumatic spring damper unit as claimed in claim 14, wherein at least one valve spring is provided for one of the throttle valves (16, 16', 16", 17, 17', 17"), said spring being associated with an actuating mechanism which is activated by means of extraneous force and by means of which the spring bias can be varied.

17. The pneumatic spring damper unit as claimed in claim 16, wherein the adjusting mechanism is embodied as an adjusting screw or adjusting nut.

18. The pneumatic spring damper unit as claimed in claim 1, wherein at least three throttle valves (16, 16', 16", 17, 17', 17") are provided for each direction of flow.

19. The pneumatic spring damper unit as claimed in claim 1, wherein at least one of the throttle valves (17) has an adjustment mechanism for the frequency range from 1 Hz to 1.5 Hz, and at least one of the throttle valves (17') has an adjustment mechanism for the frequency range from 10 Hz to 40 Hz.

* * * * *